Oct. 6, 1970    F. DURAND    3,531,850
METHOD OF ASSEMBLING A FRIABLE MEMBER AND A MEMBER OF
PLASTICALLY DEFORMABLE MATERIAL
Filed Jan. 22, 1968

Inventor:
François Durand
By Michael S. Striker
Attorney

United States Patent Office 3,531,850
Patented Oct. 6, 1970

3,531,850
METHOD OF ASSEMBLING A FRIABLE MEMBER AND A MEMBER OF PLASTICALLY DEFORMABLE MATERIAL
François Durand, 108 Boulevard Carnot, 78 Le Vesinet, France
Filed Jan. 22, 1968, Ser. No. 699,736
Claims priority, application France, Jan. 30, 1967, 93,024
Int. Cl. B23p *11/00*
U.S. Cl. 29—432                    1 Claim

ABSTRACT OF THE DISCLOSURE

The disclosure relates to the assembling of a friable member with a member of partially plastically deformable material by using a plug having one end seated in a cavity in the friable member and impressing projections on the other end of the plug into the member of partially plastically deformable material by pulling the members together with a bolt.

---

The present invention relates to methods of assembling two members respectively of friable material such as cast iron and of partially plastically deformable material such as mild steel.

In fact, assembling a member made of friable material with a member of at least partially plastically deformable material is attended by a number of difficulties.

One of the methods utilized up to now for this type of assembling work consists in properly positioning the two members by friction. However, this method requires the exertion of relatively great clamping efforts on the assembling bolts, screws or studs. Moreover, these bolts must be rather numerous and thick, so that they have relatively considerable dimensions.

Another method also used up to now consists in properly positioning the members to be assembled by fitting the shear-stressed assembling bolts, screws or studs with a high degree of precision.

Both methods mentioned hereinabove are attended by a number of inconveniences.

It is therefore the essential object of this invention to afford a relatively accurate assembling of two members consisting the one of friable material and the other of a material at least partially plastically deformable, without the inconveniences characterising conventional methods.

To this end, the present invention provides an assembling method characterised in that a cavity of frustoconical or pyramidal configuration is formed in the friable member, this cavity surrounding the orifice of the tapped hole provided for engagement by the assembling bolt, screw or stud, and that a plug of corresponding shape is disposed in this cavity, this plug consisting of a very hard material having an elastic limit considerably higher than that of the plastically deformable material constituting the other member, the thickness of said plug being such that its major base emerges somewhat from said cavity, said base being provided with projecting elements such as indentations or ribs adapted to be impressed into said plastic member when the bolt, screw or stud is tightened.

This invention is also concerned with a plug specially designed for carrying out the assembling method set forth hereinabove. This plug, made of very hard material, such as hardened alloy steel, is of frusto-conical or frusto-pyramidal configuration and its major base carries projections such as indentations or ribs for the purpose explained in the preceding paragraph.

Figure 1:
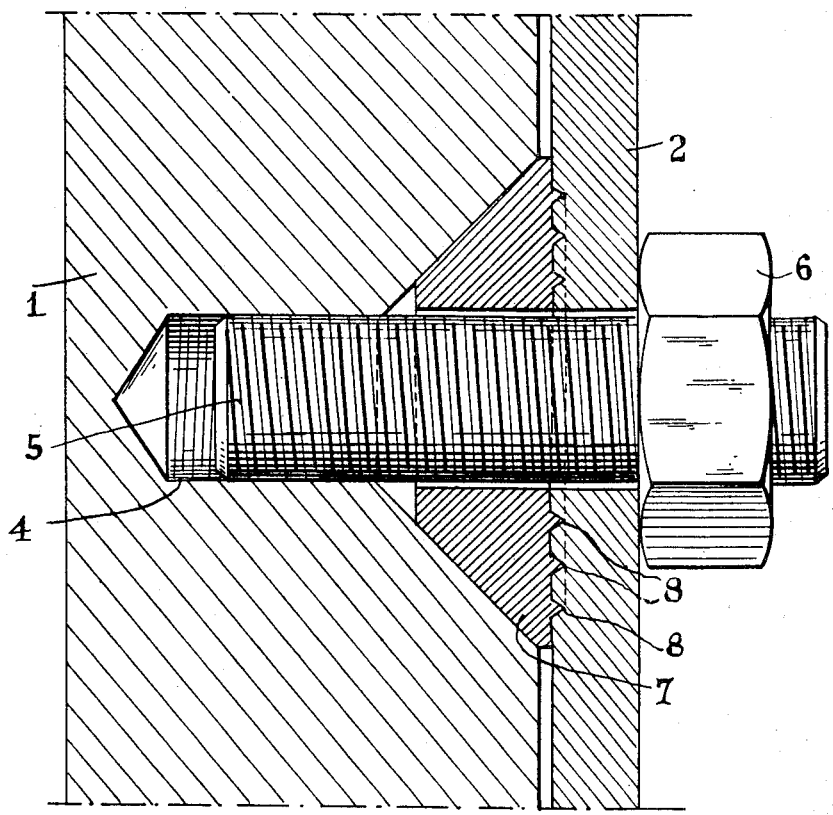
Figure 2:
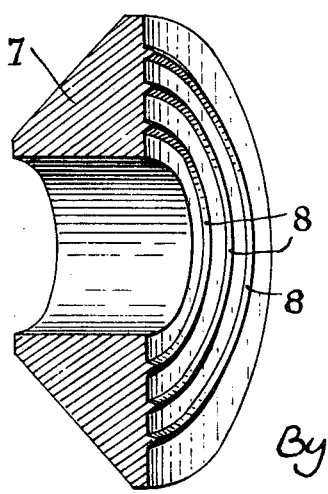

A clearer understanding of this invention will be had from the following disclosure of a typical form of actuation of the method of this invention, given with reference to the attached drawing in which:

FIG. 1 illustrates diagrammatically by way of example in fragmentary sectional view two members assembled by the method of this invention, and FIG. 2 is a view, partly in section and partly in perspective, showing a plug designed for carrying out the method of this invention.

As already explained in the foregoing, FIG. 1 shows two members assembled according to the teachings of this invention.

One member 1 consists for example of a cast-iron crankcase or like member and the other member 2 consists for example of a mild steel sheet element 2; therefore, this member 2 is at least partially plastically deformable.

According to the method of this invention, a frusto-conical cavity 3 is formed around the orifice of the tapped hole 4 formed in the cast-iron member 1 for receiving an assembling stud 5 provided with a tightening nut 6. Before positioning this other member 2 to be assembled a frusto-conical plug 7 is placed into the cavity 3, this plug 7 having the same taper as the outer wall of cavity 3.

This plug 7 consists of a very hard material such as hardened alloy steel having an elastic limit well above that of member 2. Under these conditions, this steel may be treated to have an elastic limit in excess of 150 kilograms per square millimeter (213,500 p.s.i.), the elastic limit of member 2, consisting for example of ordinary steel sheet stock, being for example of the order of 30 kg./sq. mm. (42,700 p.s.i.).

On its major base or outer face the plug 7 carries a series of circular ribs 8 concentric to the axis of the central hole 9 formed therein to permit the passage of the assembling stud 5.

On the other hand, the thickness of this plug 7 is such that when it is in its operative position in said cavity 3 its major base projects slightly from the corresponding face of member 1. Thus, the other member 2 to be assembled cannot engage directly the registering face of member 1. In fact, it can only bear against the various plugs 7 surrounding the various assembling studs 5.

Under these conditions, when the nuts 6 provided on each stud is tightened, the outer member 2 is strongly pressed against the major base of each plug 7 and the circular ribs 8 formed therein are caused to be impressed into the material of member 2.

With the method of this invention, the outer member 2 is positioned with a relatively great precision with respect to member 1. In fact, the position of member 2 is determined by the circular ribs 8 formed on the assembly plugs 7. Now these plugs are likewise properly positioned since their tapered outer surface engage the corresponding frusto-conical surface of the cavities 3 formed in the first friable member 1.

Of course, due to the impressions formed by the projecting ribs the outer member 2 is perfectly held against movement, without requiring the use of particularly high tightening forces.

With this method it is possible to assemble relatively accurately a member of friable material with a member of plastic material by using bolts considerably less cumbersome and costly than those required for conventional friction- or precision-fitted bolt assemblies.

If relatively high stress values are contemplated and the space available is rather reduced, the dimensions of the bolt or bolts may be decreased for predetermined projecting ribs formed on the major base of plug 7.

In this case it is advisable to locally preheat the member 2 of plastically deformable material, for the purpose of facilitating the penetration of the projecting ribs 8 into this material. Of course, this preheating step must be carried out just before the assembling operation.

To further facilitate the penetration of these projecting ribs, electronic heating means may also be used just before the assembling operation.

However, this invention should not be construed as being limited by the specific form of embodiment illustrated and described herein, since various modifications may be brought to the method disclosed herein and also to the plug illustrated in FIG. 2.

In this respect, it may be noted that the circular projecting ribs 8 shown in this case may be replaced by other ribs or relief elements having any other suitable arrangement.

What I claim is:

1. Method of assembling a member of friable material and a member of at least partially plastically deformable material, by means of at least a bolt engageable in a tapped hole formed in said member of friable material, this method comprising in combination the fact of forming a cavity of frusto-conical configuration in said member of friable material around the tapped hole thereof engageable by said assembling bolt, the fact of disposing a plug of corresponding shape in said cavity, said plug consisting of very hard material having an elastic limit well above that of said member of at least partially plastically deformable material, the thickness of said plug being such that its major base emerges somewhat from said cavity acting as a seat thereto, said major base comprising projecting elements adapted to impress themselves into the plastically deformable material of said member when tightening said bolt or stud, and impressing said projections into said member of partially plastically deformable material by pulling said members together with a bolt in engagement with said tapped hole.

References Cited
UNITED STATES PATENTS

| | | | |
|---|---|---|---|
| 1,389,154 | 8/1921 | Newhouse | 29—526 |
| 1,392,300 | 10/1921 | Cole | 29—526 XR |
| 1,477,657 | 12/1923 | Meyer | 29—526 XR |
| 1,584,711 | 5/1926 | Astrom | 29—526 XR |
| 2,444,276 | 6/1948 | Aldrich | 287—189.36 |
| 2,631,360 | 3/1953 | Sanford et al. | 287—189.36 XR |
| 2,807,827 | 10/1957 | Brooks. | |
| 3,300,850 | 1/1967 | Steuernagel | 29—432 X |
| 3,440,703 | 4/1969 | Millhiser. | |

CHARLIE T. MOON, Primary Examiner

U.S. Cl. X.R.

29—526; 151—35; 287—189.36